INVENTOR.
GEORGE S. CHAPMAN
BY
ATTORNEY

Feb. 16, 1965  G. S. CHAPMAN  3,169,641
WIRE DISH DRAINER WITH GLASS HOLDING ELEMENTS
Filed April 12, 1962 2 Sheets-Sheet 2
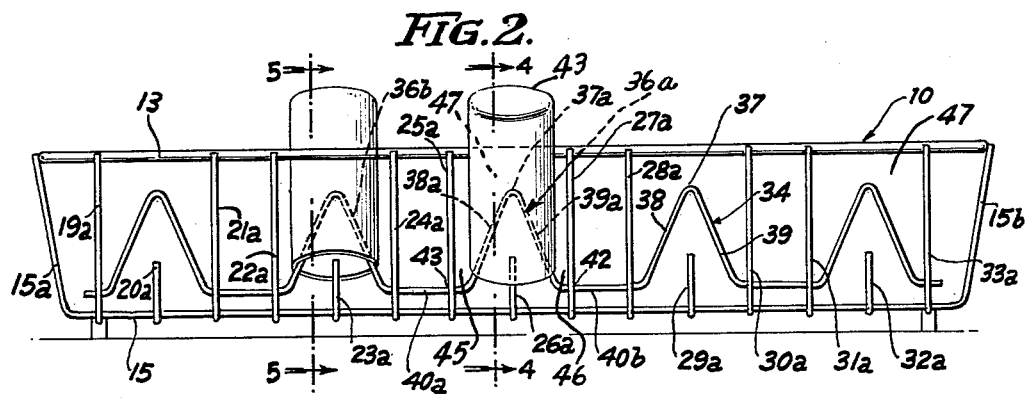
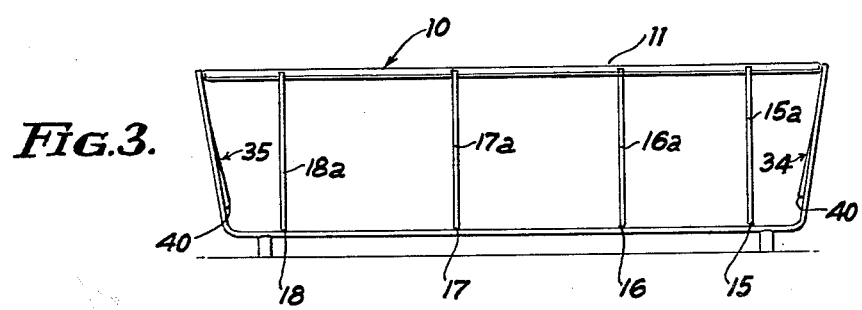
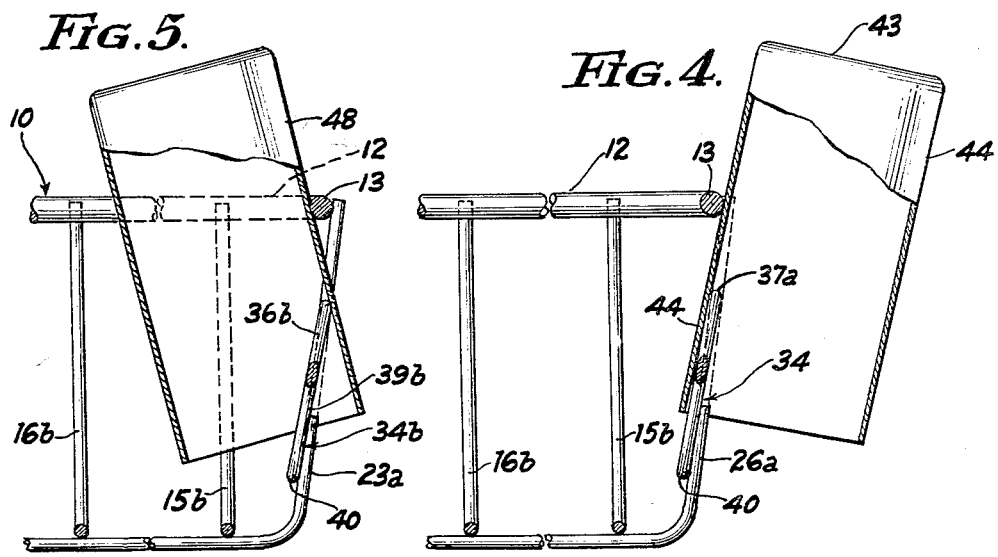
INVENTOR
GEORGE S. CHAPMAN
BY 
ATTORNEY

United States Patent Office 3,169,641
Patented Feb. 16, 1965

3,169,641
WIRE DISH DRAINER WITH GLASS HOLDING ELEMENTS
George S. Chapman, 1712 Park Blvd., Erlton, N.J.
Filed Apr. 12, 1962, Ser. No. 186,953
4 Claims. (Cl. 211—74)

This invention relates to dish drainers, and is particularly directed to devices of this category made of rubber-coated wire and of basket-like configuration adapted for draining of dishes, glasses and analogous containers.

Various drainers of this class contain, in addition to a rack for supporting dishes in an upright position, a plurality of glass or cup holding elements, these being positioned outwardly beyond the plane of the sides of the structure so as to enable glasses and cups to be readily placed thereupon in inverted position. Such outwardly extending holding elements have certain shortcomings in that the basket-like drainers are not capable of being properly nested and hence cannot be economically packed, stored or shipped, and also require relatively costly fabricating operations such as bending the holding elements outwardly beyond the plane of the basket sides, or having complicated specially-formed and expensive holding elements incorporated into the device. It is one of the objectives of my invention to provide a dish drainer without the aforesaid disadvantages, an objective accomplished by having a novel arrangement of holding elements that do not extend outwardly beyond the plane of the sides of the structure and that are adapted to conveniently receive and firmly hold glasses and cups in inverted draining position. And in this aspect of my invention it is a further object to enable glasses or analogous containers to be placed on the holding members on either the inside or outside of the basket sides.

In known devices having glass or cup-holding members, it has been the practice to have the uppermost terminals of said members of enlarged proportions, in the form of circular or expanded loops, so as to provide an adequate bearing surface for securing the supported glasses or cups in place. Since such holding members are generally constructed of wire, the forming of such loops entails fabrication operations which are expensive, thereby correspondingly adding to the cost of the product. It is another object of my invention to provide a novel form of structure comprising a plurality of glass or cup holding portions wherein the uppermost terminals are of reduced proportions, the preferred configuration of such members being inverted-V-shaped, such members being so proportioned and positioned with respect to the adjacent portions of the basket as to enable glasses and cups to be readily received by the upper apical portions of the holders and frictionally held between the downwardly diverging sides of the V-shaped holding elements and adjacent wire components of the basket.

In certain of the above-mentioned known devices, the glass-holding elements consist of a single wire extending upwardly from the base of the basket, the upper terminal of the wire being looped, the arrangement being such that each of the said holding elements is attached to the structure at a single welded portion, thereby subjecting the holding element to the danger of separation from the structure at the welded point due to repeated stresses caused by the operative placement of glasses or cups thereupon. In accordance with another object of my invention, this shortcoming is avoided by the use of a construction in which each glass or cup holding member is welded to the structure at two laterally opposite points, thereby imparting greater strength and superior lasting qualities to the holders than is possible with the aforesaid single-stem type of holder.

It is another object of my invention to provide a structure in which the base thereof contains a plurality of upwardly extending plate-holding humps of equal spacing, in contradistinction to certain conventional devices in which such humps are unequally spaced as a result of the use of certain types of glass-holding elements.

It is another important object of my invention to provide devices of the above-mentioned category in which there are glass-holding members of continuous unitary structure and comprising a plurality of integral holding elements, the structure being such as to enable such members to be readily affixed in position, whereby devices of my invention may be produced at relatively low labor and material costs.

Other objects, features and advantages will appear from the drawings and description hereinafter given.

Referring to the drawings,

FIG. 2 is a side view thereof, the drawing showing a few glasses operatively held in place.

FIG. 3 is an end view thereof.

FIG. 4 is a fragmentary section of FIG. 2 taken substantially along line 4—4, the drawing showing a glass operatively held in place on the outside of the structure.

FIG. 5 is a fragmentary section of FIG. 2 taken along line 5—5, the drawing showing a glass operatively held in place on the inside of the device.

Figure 1:
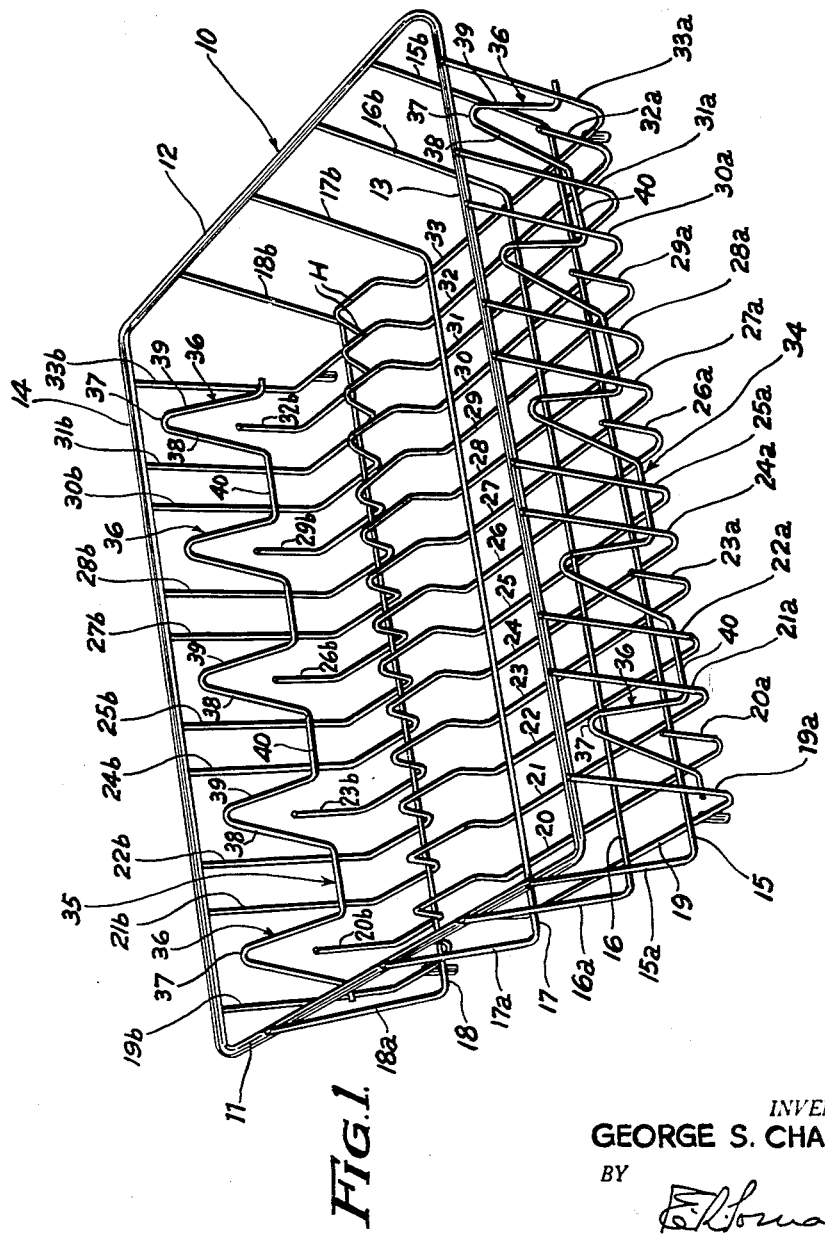
FIG. 1 is a perspective view of a dish drainer according to a preferred embodiment of my invention.

In the drawings, the dish drainer of my invention comprises the upper peripheral wire frame 10 consisting of the opposite end portions 11 and 12 and the opposite side portions 13 and 14; the longitudinal wire members 15, 16, 17 and 18; the transverse wire members 19, 20, 21, 22, 23, 24, 25, 26, 27, 28, 29, 30, 31, 32, 33; and the opposite glass or cup holding elements generally designated 34 and 35, respectively. The said longitudinal elements 15 and 18 have, at their respective opposite ends, the upstanding end portions 15a, 15b, 16a, 16b, 17a, 17b, 18a, 18b attached at their respective upper terminals to the said frame portions 11 and 12, respectively. The said transverse members 19, 21, 22, 24, 25, 27, 28, 30, 31, 33 have, at their respective opposite ends, the upstanding side portions 19a, 19b, 21a, 21b, 22a, 22b, 24a, 24b, 25a, 25b, 27a, 27b, 28a, 28b 30a, 30b, 31a, 31b, 33a, 33b, the upper terminals of said last mentioned upstanding side portions being attached, in known manner, to the frame portions 13 and 14, respectively. The said transverse members 20, 23, 26, 29 and 32 have at their respective opposite ends the respective short upstanding portions 20a, 20b, 23a, 23b, 26a, 26b, 29a, 29b, and 32a, 32b, all said short portions extending only partially upwardly. The lowermost portions of said longitudinal and transverse members constitute the base of the device, the upstanding side portions at the opposite ends of the longitudinal members constituting the opposite ends of the device, and the upstanding side portions of the transverse members constituting the opposite sides of the device. All of the said transverse members contain upwardly extending portions constituting humps generally designated H in equally spaced relation, these constituting dish-supporting members in known manner.

The said glass holding members 34 and 35 are on the respective opposite sides of the drainer each member comprising a continuous length of wire having a plurality of inverted-V-shaped elements 36 with no portions thereof extending outwardly beyond the plane of the side on which it is disposed. Each of said holding elements 36 comprises an upper apical portion 37 integral with the two downwardly diverging legs 38 and 39 joining the two adjacent bottom horizontal sections, generally designated 40, of the corresponding holding member. Thus, referring to FIG. 2, it will be seen that the legs 38a and 39a of the element 36a are joined to the bottom sections 40a and 40b of wire member 34, all other analogous diverging legs being similarly joined to corresponding sections. In the preferred embodiment illustrated, the horizontal sections 40 are welded to the inner surfaces of the adjacent upstanding portions of the transverse wires that extend up to and are joined to the upper peripheral frame, said sections being out of engagement with the short upstanding portions 20a, 20b, 23a, 23b, 26a, 26b, 29a, 29b, 32a, 32b. More specifically, said horizontal sections 40 are attached to the upstanding portions 19a, 19b, 21a, 21b, 22a, 22b, 24a, 24b, 25a, 25b, 27a, 27b, 28a, 28b, 30a, 30b, 31a, 31b, 33a, 33b, each element 36 being supported at two laterally spaced welded points, such as the welded points 43 and 42. The arrangement is such that the said elements 36 are substantially in the planes of their respective sides, it being preferred, though not required, that at least said apical portion 37 of each element 36 be in the plane defined by the two upstanding wire portions flanking the element, such as upstanding portions 25a and 27a defining the plane in which the apical portion 37a is disposed. The said short upstanding portions that extend partially upwardly, that is, the said portions 20a, 20b, 23a, 23b etc. are preferably disposed below and in spaced relation to the respective correspondingly positioned apical portions of the glass holding elements.

By referring to FIGS. 2 and 4, it will be seen that a glass 43 is operatively supported in place outside of the side of the basket, the lateral wall 44 of the glass being frictionally held in place. Due to the reduced proportions of the said apical portion 37a, the spaces 45 and 46 between said apical portion and the flanking upwardly extending wire portions 25a and 27a are correspondingly wide, said spaces and the space 47 between said apical portion and the upper frame portion 13 permitting the glass 43 to be readily placed into position over the apex of the holding element 36a and moved downwardly and inwardly within the progressively decreasing spaces 45 and 46 until the lateral wall of the glass engages the diverging legs 38a and 39a and is frictionally held between said legs and the upper wire frame portion 13. The above-described configuration of the glass holding element 36a and its positioning relative to the upstanding wires 25a, 27a and the upper peripheral frame portion 13 are such as to enable said element operatively to receive and hold a glass or analogous receptacle without any need to bend the holding element outwardly, or to employ a holding element that has been preformed so that it extends outwardly beyond the plane of the basket side.

Since the holding elements 36 are all substantially in the plane of the corresponding sides, glasses or cups can, if desired, also be operatively supported on said holders along the interior of the basket, as indicated in FIGS. 2 and 5 showing the tumbler 48 supported, substantially in the manner aforesaid, by the element 36b and peripheral frame portion 13.

Inasmuch as each holding element 36 is supported, as hereinabove described, at two welded points, said elements are more firmly held against displacement than single stem holders, and are correspondingly more firmly held against detachment. And since the holding elements do not project outwardly or inwardly from the sides of the device, they can readily be nested, thereby resulting in economical packing, storing and shipping.

It is further to be noted that the gaps formed between the bottom-most portions of the inverted-V-shaped holding elements are filled by the partially upwardly extending wire portions 20a, 20b, 23a, 23b etc., whereby the transverse wire members 20, 23, 26 etc. fill the unequal spaces between certain of the transverse wire members, thereby presenting an arrangement with all transverse wire members, and the corresponding humps 36, equally spaced, as illustrated.

The substantially sinuous continuous wire members 34 and 35 are adapted to be readily welded to the basket, thereby placing, by a simple operation, all the glass holding elements into operative position, and thus obviating the considerably more complex operations of separately positioning each glass holding element, as is necessary in certain known structures. The fabrication of my novel construction can thus be economically effected.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. A dish drainer of basket-like structure having a base, two opposite sides and two opposite ends, and comprising an upper peripheral frame, a plurality of spaced longitudinal wire members having opposite upstanding end portions forming said opposite ends of said structure, a plurality of spaced transverse wire members having opposite upstanding end portions forming said opposite sides of the structure, portions of said longitudinal and transverse wire members being in crossing relation and constituting components of said base, and a plurality of container holding elements disposed between certain of said upstanding wire portions, whereby each of said holding elements is flanked by two of said upstanding supporting wire portions, said holding elements being spaced below said frame and each comprising an upper apical portion, two downwardly extending diverging legs and two substantially horizontal sections extending in opposite directions from said respective legs and attached to the flanking upstanding wire portions, the narrowest portion of said holding elements being at the apical portion, whereby the laterally opposite spaces between each holding element and the flanking upstanding wire portions are of progressively decreasing proportions from said apical portion downwardly, said upper apical portion of said holding elements being in the planes defined by said respective flanking upstanding supporting wire portions.

2. A dish drainer of basket-like structure having a base, two opposite sides and two opposite ends, and comprising an upper peripheral frame, a plurality of spaced longitudinal wire members having opposite upstanding end portions forming said opposite ends of said structure, a plurality of spaced transverse wire members having opposite upstanding end portions forming said opposite sides of the structure, portions of said longitudinal and transverse wire members being in crossing relation and constituting components of said base, and a plurality of container holding elements disposed between certain of said upstanding wire portions, whereby each of said holding elements is flanked by two of said upstanding wire portions, each of said flanking upstanding wire portions extending up to and being connected to said peripheral frame, said holding elements being spaced below said frame and each being of inverted-V-shaped configuration, the lowermost portions of each of said holding elements having two substantially horizontal sections extending in opposite directions and attached to the flanking upstanding wire portions, the uppermost portions of said holding elements being in the planes defined by said respective flanking upstanding supporting wire portions.

3. A dish drainer according to claim 2, certain of said upstanding wire portions extending partially upwardly and terminating below and in spaced relation to the apices of said respective inverted-V-shaped holding elements.

4. A dish drainer of basket-like structure having a base, two opposite sides and two opposite ends, and comprising an upper peripheral frame, a plurality of spaced longitudinal wire members having opposite upstanding end portions forming said opposite ends of said structure, a plurality of spaced transverse wire members having opposite upstanding end portions forming said opposite sides of the structure, portions of said longitudinal and transverse wire members being in crossing relation and constituting components of said base, and a single length of wire extending across and attached to certain of said upstanding wire portions, said length of wire being formed into a plurality of spaced inverted-V-shaped portions joined at their bottom-most portions by connecting sections, said inverted-V-shaped portions constituting container holding elements, said holding elements being disposed between certain of said upstanding wire portions, whereby each of said holding elements is flanked by two of said upstanding supporting wire portions, said holding elements being spaced below said frame and having only their uppermost portions positioned in the planes defined by the respective flanking upstanding supporting wire portions, each of said flanking upstanding wire portions extending up to and being connected to said peripheral frame, certain of said other upstanding wire portions extending partially upwardly and terminating below and in spaced relation to the apices of said respective inverted-V-shaped holding elements.

References Cited by the Examiner
UNITED STATES PATENTS

| | | |
|---|---|---|
| 489,190 | 1/93 | Groenendyke. |
| 2,697,525 | 12/54 | Breneman _____ 211—41 |
| 2,739,715 | 3/56 | Planeta _____ 211—41 |
| 2,864,509 | 12/58 | Watral _____ 211—41 |
| 2,885,087 | 5/59 | Bliss _____ 211—41 |
| 3,032,203 | 5/62 | Romero _____ 211—41 |

FRANK L. ABBOTT, *Primary Examiner.*

CLAUDE A. LeROY, *Examiner.*